(12) United States Patent
Reddy

(10) Patent No.: US 6,946,016 B2
(45) Date of Patent: Sep. 20, 2005

(54) PSA SHARING

(75) Inventor: Satish Reddy, Irvine, CA (US)

(73) Assignee: Fluor Technologies Corporation, Aliso Viejo, CA (US)

(*) Notice: Subject to any disclaimer, the term of this patent is extended or adjusted under 35 U.S.C. 154(b) by 0 days.

(21) Appl. No.: 10/480,361

(22) PCT Filed: Dec. 17, 2002

(86) PCT No.: PCT/US02/40363
§ 371 (c)(1),
(2), (4) Date: Jul. 22, 2004

(87) PCT Pub. No.: WO03/051491
PCT Pub. Date: Jun. 26, 2003

(65) Prior Publication Data
US 2004/0255778 A1 Dec. 23, 2004

Related U.S. Application Data
(60) Provisional application No. 60/342,261, filed on Dec. 18, 2001.

(51) Int. Cl.$^7$ .............................................. B01D 53/047
(52) U.S. Cl. .............................. 95/96; 96/130; 96/143; 423/652; 423/656
(58) Field of Search ....................... 95/96–98, 100–105, 95/117, 139, 143; 423/359, 651, 652, 655, 656; 96/130, 134, 136, 143

(56) References Cited

U.S. PATENT DOCUMENTS

| | | | | |
|---|---|---|---|---|
| 3,430,418 A | * | 3/1969 | Wagner | 95/100 |
| 3,986,849 A | * | 10/1976 | Fuderer et al. | 95/100 |
| 4,863,492 A | * | 9/1989 | Doshi et al. | 95/8 |
| 4,886,651 A | * | 12/1989 | Patel et al. | 423/359 |
| 5,112,590 A | * | 5/1992 | Krishnamurthy et al. | 423/418.2 |
| 5,152,975 A | * | 10/1992 | Fong et al. | 423/652 |
| 5,152,976 A | * | 10/1992 | Fong et al. | 423/652 |
| 5,354,547 A | * | 10/1994 | Rao et al. | 423/650 |
| 5,409,684 A | * | 4/1995 | Fuentes | 423/359 |
| 5,538,706 A | * | 7/1996 | Kapoor et al. | 423/418.2 |
| 6,086,840 A | * | 7/2000 | Whitney et al. | 423/359 |
| 6,303,092 B1 | * | 10/2001 | Anand et al. | 423/418.2 |
| 6,328,945 B1 | * | 12/2001 | Hufton et al. | 423/418.2 |

* cited by examiner

Primary Examiner—Robert H. Spitzer
(74) Attorney, Agent, or Firm—Rutan & Tucker, LLP

(57) ABSTRACT

Contemplated configurations and methods include a hydrogen pressure swing adsorption unit that receives a feed gas comprising a hydrogen production stream and a non-recycled hydrogen-containing waste stream.

14 Claims, 2 Drawing Sheets

PSA SHARING

This application claims the benefit of U.S. provisional patent application with the Ser. No. 60/342,261, filed Dec. 18, 2001, and which is incorporated herein by reference.

FIELD OF THE INVENTION

The field of the invention is gas processing, and especially as it relates to production of a hydrogen product from multiple gas sources.

BACKGROUND OF THE INVENTION

Numerous industrial processes, and especially processes in refineries and processing plants produce gas streams containing considerable amounts of hydrogen. While some of the gas streams are hydrogen production streams (e.g., a hydrogen containing stream from which hydrogen has not been removed, and especially streams produced by a steam reformer/shift converter system), other gas streams are off-gas streams (typically a hydrogen containing stream from which a portion of the hydrogen has previously been removed in a reaction consuming hydrogen or other hydrogen sequestering process).

Hydrogen contained in hydrogen production streams can be recovered using various methods well known in the art. For example, Doshi et al. employ a membrane assembly to produce from a feed gas a hydrogen-rich permeate, which is then fed into a hydrogen pressure swing adsorption unit to generate purified hydrogen as described in U.S. Pat. No. 4,863,492. Alternatively, as described in U.S. Pat. No. 5,152,975 to Fong et al., natural gas is subjected to partial oxidation and shift conversion to form a hydrogen production stream that is then directly routed into a hydrogen pressure swing adsorption unit to generate purified hydrogen.

Similarly, hydrogen contained in offgas streams can be recovered using numerous methods well known in the art. For example, Fong et al. describe in U.S. Pat. No. 5,152,976 partial oxidation and shift conversion of various offgases to form a hydrogen production stream that is then routed into a hydrogen pressure swing adsorption unit to generate purified hydrogen. Thus, it should be recognized that it is generally known to separately purify hydrogen from a hydrogen production stream or an offgas stream by employing separate hydrogen PSA units for each of the streams. However, it has apparently not been recognized that hydrogen can be purified from both a hydrogen production stream and an offgas stream employing a common hydrogen PSA unit.

SUMMARY OF THE INVENTION

The present invention is directed to configurations and methods in which a pressure swing adsorption unit (PSA) is employed to generate a hydrogen product from multiple hydrogen-containing streams in a plant.

In one preferred aspect of the inventive subject matter, a plant includes a hydrogen pressure swing adsorption unit that receives a feed stream, wherein the feed stream comprises a hydrogen production stream from a steam reformer (e.g., syngas for ammonia production) and a non-recycled hydrogen-containing waste stream (e.g., fluid catalytic cracking offgas, thermal cracking offgas, hydrotreating offgas, or catalytic reforming offgas), and wherein the hydrogen pressure swing adsorption unit produces a non-recycled tail gas and a high-purity hydrogen product. It is further contemplated that at least part of the non-recycled tail gas is combusted in the steam reformer.

Preferred plants may further include an acid gas removal unit that is fluidly coupled to a methanator, wherein the acid gas removal unit receives at least a portion of the hydrogen production stream. In yet other configurations, contemplated plants may also include a booster that increases the pressure of the non-recycled hydrogen-containing waste stream to the pressure of the hydrogen production stream. Thus, viewed from another perspective, preferred plants may comprise a PSA that receives a feed gas comprising a hydrogen production stream and a non-recycled hydrogen-containing waste stream.

Consequently, a method of producing a hydrogen product will include one step in which a hydrogen production stream from a steam reformer and a non-recycled hydrogen-containing waste stream are provided. In another step, the hydrogen production stream and the non-recycled hydrogen-containing waste stream are combined. In a still further step, hydrogen is isolated from the combined hydrogen production stream and the non-recycled hydrogen-containing waste stream in a pressure swing adsorption unit, thereby forming the desired hydrogen product stream and a non-recycled tail gas.

Various objects, features, aspects and advantages of the present invention will become more apparent from the following detailed description of preferred embodiments of the invention, along with the accompanying drawings in which like numerals represent like components.

DETAILED DESCRIPTION

The inventor discovered that plants may include a shared PSA that receives a feed gas comprising a hydrogen production stream and a non-recycled hydrogen-containing waste stream. The term "hydrogen production stream" as used herein refers to a gas stream that comprises significant quantities (i.e., at least 40 mol %) of hydrogen (i.e., $H_2$), and from which hydrogen has not previously been removed in a filtration process, adsorption process, and/or hydrogen-consuming reaction. The term "non-recycled hydrogen-containing waste stream" as used herein refers to a gas stream that comprises hydrogen (typically less than 40 mol %) and that is not a PSA tail gas that is recycled back to the same PSA. In most cases, the non-recycled hydrogen-containing waste stream is a gas stream from which hydrogen has previously been removed in a filtration process, adsorption process, and/or hydrogen-consuming reaction, or in which hydrogen is present at a concentration of less than 15 mol %. As further used herein, the term "about" in conjunction with a numeral refers to the numeral and a deviation thereof in the range of +/−10% of the numeral. For example, the term "about 400 psia" refers to a range of 360 psia (inclusive) to 440 psia (inclusive).

Figure 1:
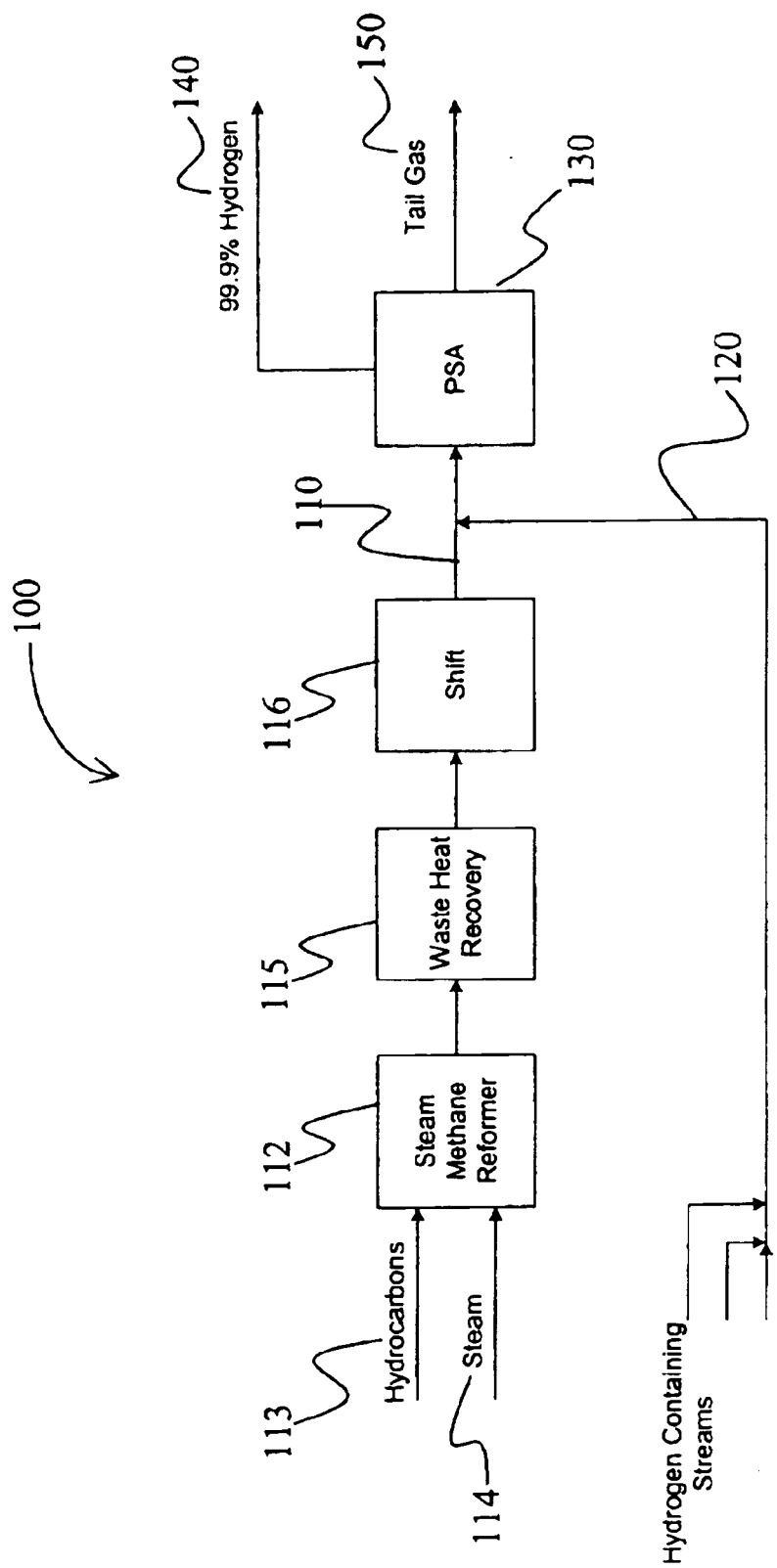
FIG. 1 is a schematic view of one exemplary PSA sharing configuration.

In one especially preferred aspect of the inventive subject matter, contemplated PSA sharing configurations may be employed in a newly constructed hydrogen production plant as depicted in FIG. 1. Here, plant 100 has a hydrogen production stream 110 that is produced in steam reformer 112 receiving a hydrocarbon feed 113 and steam 114. Waste heat recovery unit 115 recovers heat from the hydrogen production stream 110, and the shift converter 116 converts carbon monoxide to carbon dioxide. Non-recycled hydrogen-containing waste stream 120 (which may be one or more streams) and hydrogen production stream 110 are combined in a manifold (not shown) prior to entering the hydrogen PSA 130, which produces purified hydrogen 140 (the hydrogen product) and non-recycled tail gas 150. The term "non-recycled tail gas" as used herein refers to tail gas of a PSA unit that is not recycled back to the same PSA unit.

Figure 2:
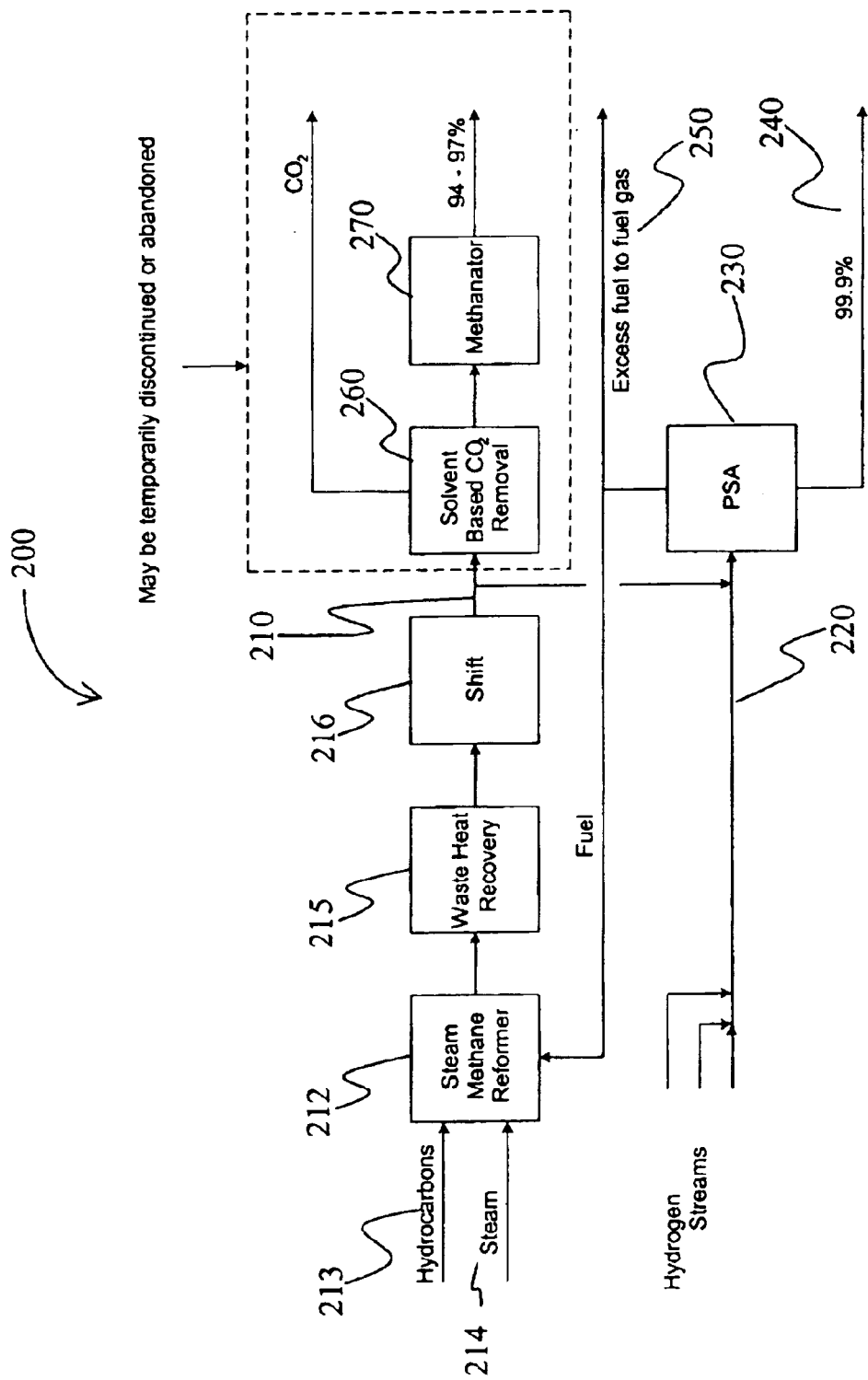
FIG. 2 is a schematic view of another exemplary PSA sharing configuration.

Alternatively, as depicted in FIG. 2, an exemplary PSA sharing configuration is integrated into an already existing hydrogen production plant. Here, integrated plant 200 has a hydrogen production stream 210 that is produced in steam reformer 212, which receives a hydrocarbon feed 213 and steam 214. Waste heat recovery unit 215 recovers heat from the hydrogen production stream 210, and shift converter 216 converts carbon monoxide to carbon dioxide. Non-recycled hydrogen-containing waste stream 220 (which may be one or more streams) and hydrogen production stream 210 are combined in a manifold (not shown) prior to entering the hydrogen PSA 230, which produces purified hydrogen 240 (the hydrogen product) and non-recycled tail gas 250, which may be employed as fuel in the reformer or fed to the fuel header of the plant. Of course it should be recognized that where contemplated PSA sharing configurations are integrated as upgrade to an already existing hydrogen production plant, such plants may further include a solvent based acid gas removal system 260 in combination with a methanator 270. Both solvent based acid gas removal system 260 and methanator 270 may be temporarily or permanently taken offline.

With respect to the hydrogen production stream, it is contemplated that all hydrogen-containing gas streams as defined above are suitable for use in conjunction with the teachings presented herein. However, particularly contemplated hydrogen production streams include gas streams that are generated by a reforming process (e.g., methanol, natural gas, or naphtha steam reforming), partial oxidation process (e.g., liquid and/or heavy hydrocarbons), chemical or electrochemical hydrogen production process. Thus, almost all of contemplated hydrogen production streams will include significant quantities of hydrogen, with hydrogen contents of at least 40 mol %, more typically at least 55 mol %, and most typically at least 70 mol %.

It is still further preferred that particularly suitable hydrogen production streams include those from which hydrogen has not previously been removed (e.g. via filtration, adsorption, and/or hydrogen-consuming processes). Thus, depending on the particular source, suitable hydrogen production streams may have various pressures, and it is generally contemplated that the pressure of the hydrogen production stream is not limiting to the inventive subject matter. For example, where a hydrogen production stream is produced in an electrochemical process, the pressure of the hydrogen production stream may be between less than atmospheric pressure and 1–200 psia. On the other hand, where the hydrogen production stream is derived from a natural gas steam reforming process, the hydrogen production stream may have a pressure of between about 300–1500 psia, and most typically of about 500–1000 psia. However, it is generally preferred that the pressure of the hydrogen production stream is substantially identical (i.e., ±5%) to the operating pressure (under inlet conditions for the gas to be purified) of the hydrogen PSA.

Similarly, the temperature of suitable hydrogen production streams may vary significantly, and it should be recognized that a particular temperature is not limiting to the inventive subject matter presented herein. Thus, suitable temperatures will generally be in the range of about 0° F. to about 500° F., and more typically in the range of about 50° F. to about 150° F. With respect to components other than hydrogen in contemplated hydrogen production streams, it should be recognized that such components will vary depending on the particular process and feed employed in the production of the hydrogen production stream. However, most typically such components will include CO, $CO_2$, $H_2S$, $H_2O$, and $CH_4$. In still further contemplated aspects, suitable hydrogen production streams may also be combined from various gas streams (e.g., bypass, or recycle streams, purified hydrogen stream, etc.), so long as at least one of the various gas streams is a hydrogen production stream.

Similarly, the particular nature of contemplated non-recycled hydrogen-containing waste streams may vary considerably and it is generally contemplated that all gas streams containing hydrogen are suitable (so long as such gas streams are not a PSA tail gas that is recycled back to the same PSA). Furthermore, it is generally preferred that contemplated non-recycled hydrogen-containing waste streams will comprise less than 40 mol % of hydrogen, and more typically between about 5 mol % and 30 mol %. Therefore, contemplated non-recycled hydrogen-containing waste streams particularly include gas streams from which a portion of hydrogen has been removed (e.g., via filtration, adsorption, and/or hydrogen-consuming processes). For example, especially preferred non-recycled hydrogen-containing waste streams include tail gas streams from another hydrogen PSA unit, a fluid catalytic cracking offgas, a thermal cracking offgas, a hydrotreating offgas, and/or a catalytic reforming offgas.

Consequently, the composition of contemplated non-recycled hydrogen-containing waste streams may vary considerably, and it is generally contemplated that a particular composition of the non-recycled hydrogen-containing waste stream is not limiting to the inventive subject matter so long as the non-recycled hydrogen-containing waste stream contains at least some (e.g., at least 5 mol %) hydrogen. Thus, contemplated non-recycled hydrogen-containing waste streams may include (besides hydrogen) $H_2O$, $H_2S$, $CH_4$, $C_2$–$C_4$ hydrocarbons, CO, $CO_2$, $O_2$, and to a lesser degree (i.e., typically below 500 ppm) aromatics, mercaptans, $NH_3$, etc.

With respect to the pressure of contemplated non-recycled hydrogen-containing waste streams it should be recognized that depending on the particular source(s) the pressure may vary considerably. However, it is generally preferred that the pressure is between about atmospheric pressure and 1000 psia, and more preferably between about 300 psia and 600 psia. In still further preferred aspects, it is contemplated that the pressure of suitable non-recycled hydrogen-containing waste streams is substantially identical (i.e., ±5%) to the operating pressure (under inlet conditions for the gas to be purified) of the hydrogen PSA. However, where the pressure of the non-recycled hydrogen-containing waste stream is different from the pressure of the hydrogen production stream, it should be recognized that the pressure may be adjusted to substantially the same pressure via a booster, a turbine, or an expander. In yet further contemplated aspects of the inventive subject matter, it should be recognized that suitable non-recycled hydrogen-containing waste streams may be formed from various sources, and all sources that provide a hydrogen-containing gas are considered suitable for use herein.

The ratio of hydrogen production stream to non-recycled hydrogen-containing waste stream may vary depending on the operation of the plant, and it is generally contemplated that the non-recycled hydrogen-containing waste stream may be temporarily combined with the hydrogen production stream (e.g., where non-recycled hydrogen-containing waste streams are available in batch mode) or continuously combined, and that the non-recycled hydrogen-containing waste stream may make up between about 0.1 vol % to about 70 vol %, more typically between about 10 vol % to about 40 vol %, and most typically between about 15 vol % to about 25 vol %.

In a particularly preferred aspect of the inventive subject matter, it is contemplated that the hydrogen production stream and the non-recycled hydrogen-containing waste stream(s) are combined in a manifold (and may fierter be mixed in a mixing device), which is typically located upstream of the hydrogen PSA unit. However, it should be appreciated that various alternative manners of combining the hydrogen production stream and the non-recycled hydrogen-containing waste stream(s) are also contemplated, including providing an intermediate holding vessel for one or both gas streams. In further alternative aspects, it is contemplated that the hydrogen production stream and the non-recycled hydrogen-containing waste stream(s)are not combined at all, and that production cycles in the hydrogen PSA are performed using either hydrogen production steam or the non-recycled hydrogen-containing waste stream(s). Still further combination may be performed within the hydrogen PSA unit.

It is generally contemplated that all known hydrogen PSA units are suitable for use in conjunction with the teachings presented herein, and exemplary units and processing conditions are described in U.S. Pat. No. 3,430,418 to Wagner or in U.S. Pat. No. 3,986,849 to Fuderer et al. Furthermore, it is contemplated that the particular configuration and volume of one or more suitable PSA units will predominantly depend on the amount of hydrogen production gas and/or non-recycled hydrogen-containing waste streams. Thus, one or more hydrogen PSA units may be operated serially or in parallel.

Where methods and configurations according to the inventive subject matter are employed in an already existing hydrogen production plant in which $CO_2$ is removed in a solvent based process (which is typically the throughput limiting step) with a methanator, it is contemplated that the hydrogen production gas stream may be temporarily or permanently rerouted to the common hydrogen PSA unit. Consequently, it is contemplated that rerouting the hydrogen production gas to the hydrogen PSA may 'de-bottle neck' the hydrogen purification process in an existing hydrogen production plant.

It is further contemplated that the non-recycled hydrogen-containing waste stream(s) may further be processed to remove/recover hydrocarbon liquids before entering the PSA, and an especially preferred hydrocarbon liquids removal process is described in U.S. Provisional Application with the Ser. No. 60/342,262, which was filed Dec. 17, 2001, and which is incorporated herein by reference.

Therefore, the inventor contemplates a plant that includes a hydrogen pressure swing adsorption unit receiving a feed stream, wherein the feed stream comprises a hydrogen production stream from a steam reformer and a non-recycled hydrogen-containing waste stream, and wherein the hydrogen pressure swing adsorption unit produces a non-recycled tail gas and a high-purity hydrogen product. In especially preferred plants, the non-recycled hydrogen-containing waste stream is combined with the hydrogen production stream after the hydrogen production stream has been subjected to a shift conversion, and at least part of the non-recycled tail gas is combusted in the steam reformer. Particularly preferred plants may further include an acid gas removal unit that is fluidly coupled to a methanator, wherein the acid gas removal unit receives at least a portion of the hydrogen production stream. Thus, viewed from another perspective, contemplated plants may include a hydrogen pressure swing adsorption unit that receives a feed gas comprising a hydrogen production stream and a non-recycled hydrogen-containing waste stream.

Consequently, a method of producing a hydrogen product (e.g., a purified hydrogen stream) may include a step in which a hydrogen production stream from a steam reformer and a non-recycled hydrogen-containing waste stream are provided. In another step, the hydrogen production stream and the non-recycled hydrogen-containing waste stream are combined, and in still another step, hydrogen is separated from the combined hydrogen production stream and the non-recycled hydrogen-containing waste stream in a pressure swing adsorption unit, to thereby form a hydrogen product stream and a non-recycled tail gas.

Thus, specific embodiments and applications of PSA sharing have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of producing a hydrogen product, comprising:
   providing a hydrogen production stream from a steam reformer and a non-recycled hydrogen-containing waste stream;
   combining the hydrogen production stream and the non-recycled hydrogen-containing waste stream; and
   separating hydrogen from the combined hydrogen production stream and the non-recycled hydrogen-containing waste stream in a pressure swing adsorption unit, and thereby forming a hydrogen product stream and a non-recycled tail gas.

2. The method of claim 1 wherein the hydrogen production stream is further subjected to a shift conversion before the step of combining.

3. The method of claim 1 wherein the non-recycled hydrogen-containing waste stream is provided by a waste stream selected from the group consisting of a fluid catalytic cracking offgas, a thermal cracking offgas, a hydrotreating offgas, and a catalytic reforming offgas.

4. The method of claim 1 wherein the non-recycled tail gas is combusted in the steam reformer.

5. A plant comprising:
   a hydrogen pressure swing adsorption unit receiving a feed stream;
   wherein the feed stream comprises a hydrogen production stream from a steam reformer and a non-recycled hydrogen-containing waste stream; and wherein the hydrogen pressure swing adsorption unit produces a non-recycled tail gas and a high-purity hydrogen product.

6. The plant of claim 5 wherein the non-recycled hydrogen-containing waste stream is combined with the hydrogen production stream after the hydrogen production stream has been subjected to a shift conversion.

7. The plant of claim 5 wherein the non-recycled hydrogen-containing waste stream is selected from the group consisting of a fluid catalytic cracking offgas, a thermal cracking offgas, a hydrotreating offgas, and a catalytic reforming offgas.

8. The plant of claim 5 wherein at least part of the non-recycled tail gas is combusted in the steam reformer.

9. The plant of claim 5 further comprising an acid gas removal unit fluidly coupled to a methanator, and wherein the acid gas removal unit receives at least a portion of the hydrogen production stream.

10. The plant of claim 5 further comprising a booster that increases pressure of the non-recycled hydrogen-containing waste stream to a pressure of the hydrogen production stream.

11. A plant comprising a hydrogen pressure swing adsorption unit that receives a feed gas comprising a hydrogen production stream and a non-recycled hydrogen-containing waste stream.

12. The plant of claim 11 wherein the hydrogen production stream is provided by a steam reformer, and wherein the non-recycled hydrogen-containing waste stream is provided by a waste stream selected from the group consisting of a fluid catalytic cracking offgas, a thermal cracking offgas, a hydrotreating offgas, and a catalytic reforming offgas.

13. The plant of claim 11 wherein the non-recycled hydrogen-containing waste stream is combined with the hydrogen production stream after the hydrogen production stream has been subjected to a shift conversion.

14. The plant of claim 11 wherein the hydrogen pressure swing adsorption unit produces a non-recycled tail gas that is combusted in a steam reformer.

* * * * *